May 28, 1957 A. ELLINS 2,793,841
MIXING DEVICE FOR FROZEN DESSERTS
Filed July 20, 1955 3 Sheets-Sheet 1
FIG. 1.
FIG. 2.
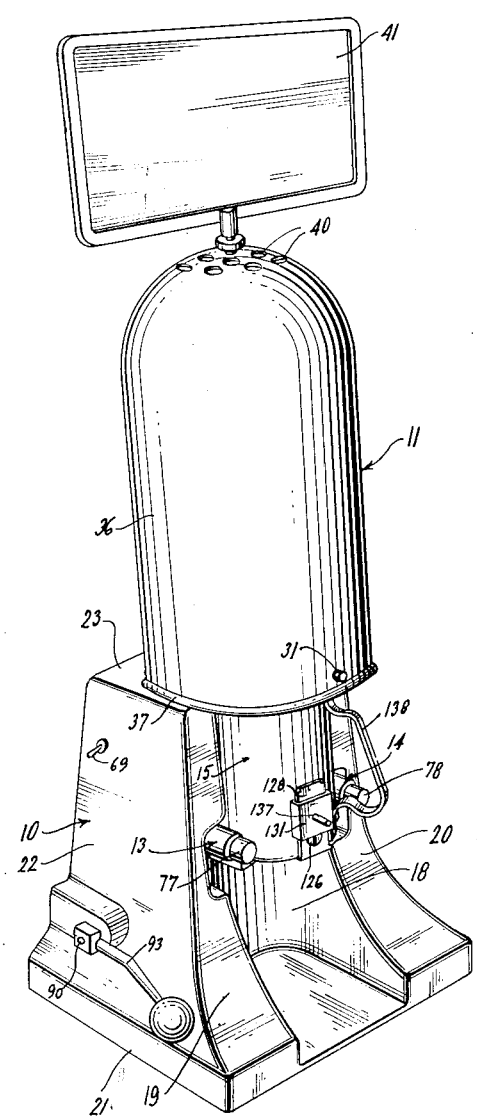
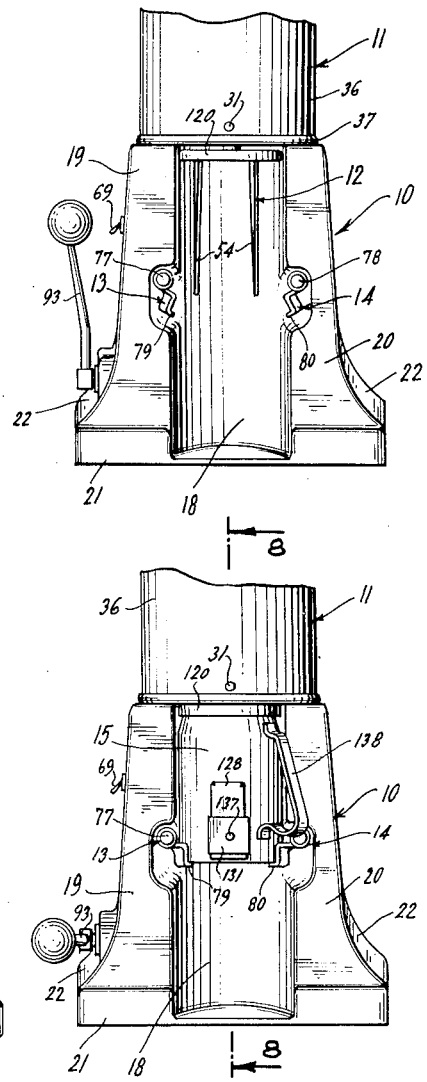
FIG. 3.
INVENTOR.
ARTHUR ELLINS
BY Mock & Blum
ATTORNEYS May 28, 1957 A. ELLINS 2,793,841
MIXING DEVICE FOR FROZEN DESSERTS
Filed July 20, 1955 3 Sheets-Sheet 2
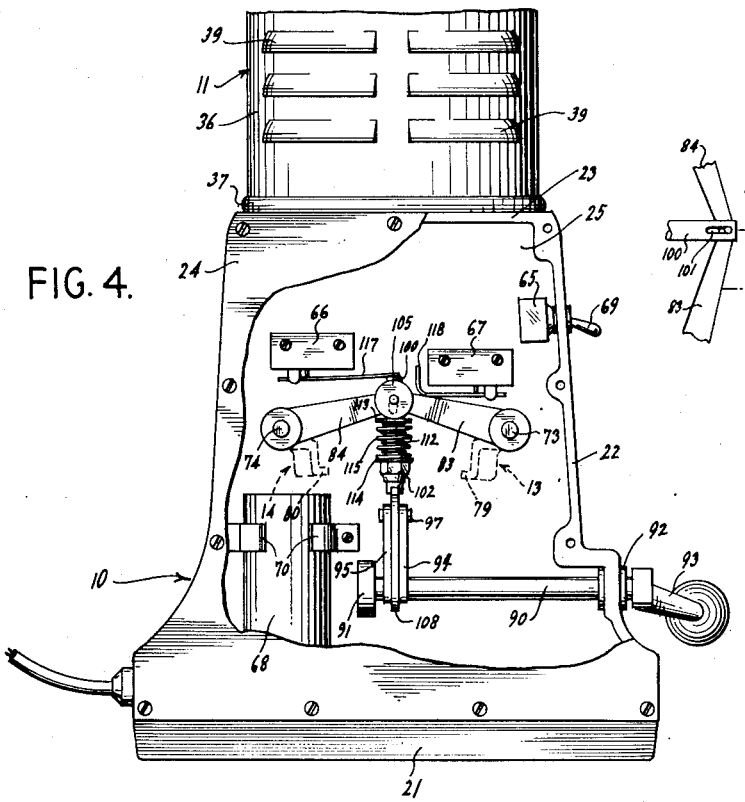
FIG. 4.
FIG. 7.
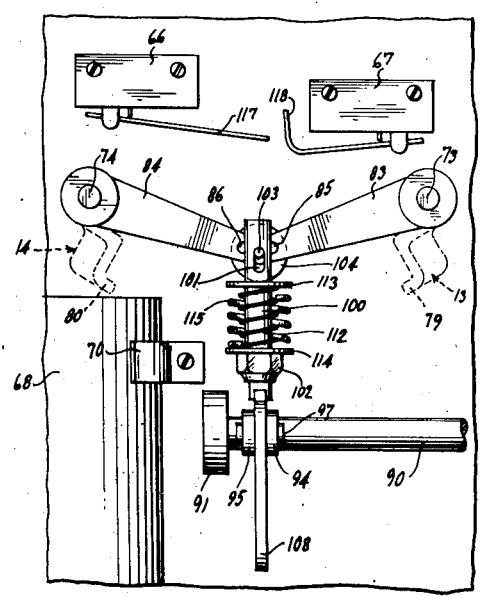
FIG. 5.
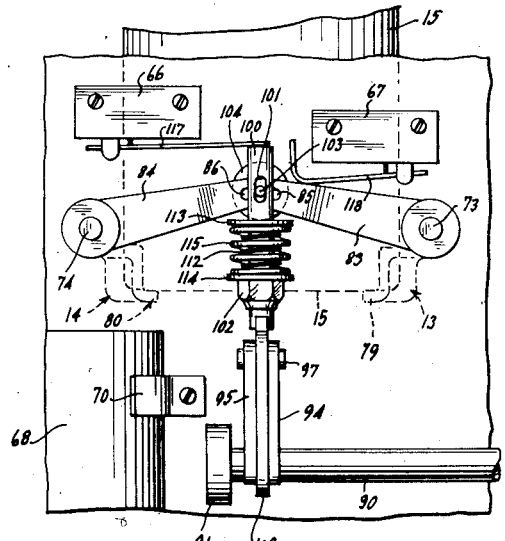
FIG. 6.
INVENTOR.
ARTHUR ELLINS
BY
Mock & Blum
ATTORNEYS May 28, 1957 A. ELLINS 2,793,841
MIXING DEVICE FOR FROZEN DESSERTS
Filed July 20, 1955 3 Sheets-Sheet 3
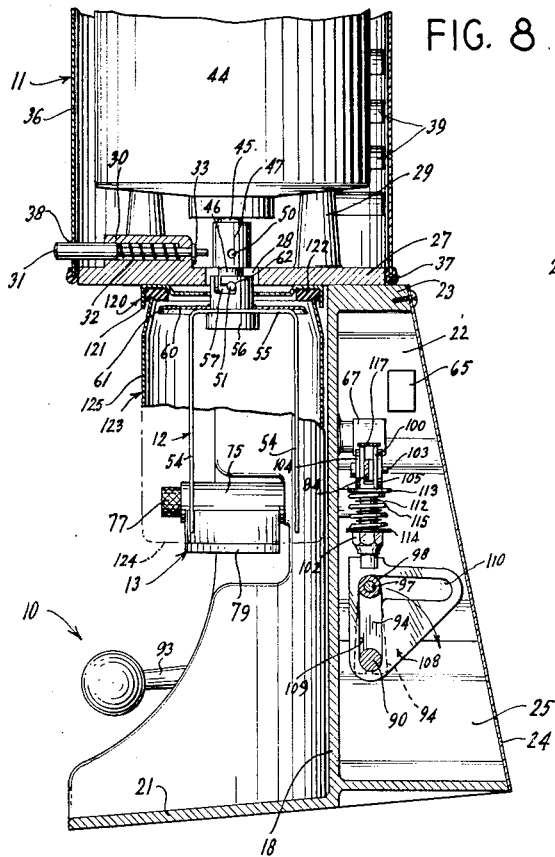
FIG. 8.
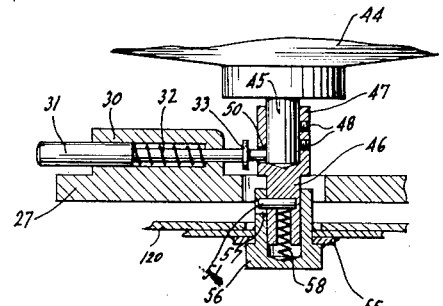
FIG. 9.
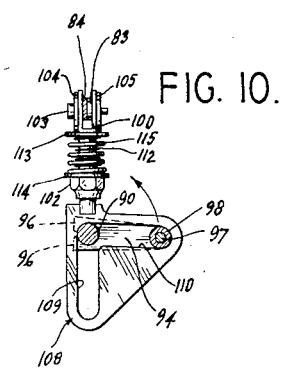
FIG. 10.
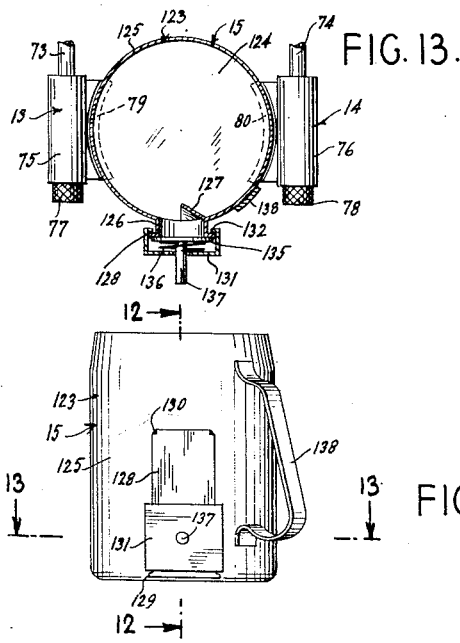
FIG. 13.
FIG. 12.
FIG. 11.
INVENTOR.
ARTHUR ELLINS
BY
Mock & Blum
ATTORNEYS United States Patent Office 2,793,841
Patented May 28, 1957

2,793,841

MIXING DEVICE FOR FROZEN DESSERTS

Arthur Ellins, New York, N. Y., assignor to Federal Machine & Tool Co., Inc., Long Island City, N. Y., a corporation of New York Application July 20, 1955, Serial No. 523,193

10 Claims. (Cl. 259—108)

This invention relates to material treating devices of the type adapted to mix, stir, agitate and the like.

The particular embodiment of the present invention, which is illustrated in the drawings and which will be described hereinafter in greater detail, comprises generally an upstanding base or stand carrying a depending material engaging or mixing element, and means for releasably supporting a container in operative condition receiving the mixing element. While the device of the invention has been primarily developed and employed in connection with the mixing of foodstuffs, such as ice cream and the like, and will be described hereinafter with particular reference thereto, it is fully appreciated that the invention is equally applicable to a wide variety of other material treating processes.

It is a general object of the present invention to provide a mixing device of the type described which is simple and foolproof in operation, eliminates spillage of the material being mixed, and wherein inadvertent operation of the mixing element is effectively prevented and the container is firmly and positively, but releasably retained in its operative position, so that the device is entirely safe in use.

It is a more particular object of the present invention to provide a mixing device having the advantageous characteristics mentioned in the foregoing paragraph, which is adapted to quickly and efficiently mix relatively hard materials, such as ice cream or the like; and, the invention contemplates the provision of a novel container for use in conjunction with the improved mixing device which serves to readily dispense, as required, any desired quantity of the material operated upon.

It is a further object of the present invention to provide a material treating device of the type described which is sturdy in construction, durable and reliable in use, wherein moving parts are safely guarded and readily accessible for maintenance and repair, and which can be manufactured and maintained at a reasonable cost.

Other objects of the present invention will become apparent upon reading the following specification and referring to the accompanying drawings, which forms a material part of this disclosure.

The invention accordingly consists in the features of construction, combinations of elements, and arrangements of parts, which will be exemplified in the construction hereinafter described, and of which the scope will be indicated by the appended claims.

In the drawings:

Figure 1 is a front perspective view showing a mixing device of the present invention in its operative, dispensing condition;

Fig. 2 is a partial, front elevational view showing the device of Fig. 1 in an inoperative condition, with the container removed;

Fig. 3 is a view similar to Fig. 2, but illustrating the device in operative condition in conjunction with a container;

Fig. 4 is a partial, rear elevational view showing the mixing device partly broken away for clarity of understanding, and illustrating attempted operation of the device without placement of a container in operative condition;

Fig. 5 is a partial, rear elevational view of the mixing device in its inoperative condition, with parts removed for purposes of illustration;

Fig. 6 is a view similar to Fig. 5, but showing the device in its operative condition;

Fig. 7 is a schematic representation of the electrical circuitry of the instant mixing device;

Fig. 8 is a partial, sectional elevational view showing the mixing in its operative condition;

Fig. 9 is a fragmentary, sectional view, somewhat enlarged, showing a preferred construction of coupling between the mixing element and motor;

Fig. 10 is a fragmentary, side elevational view showing preferred means for actuating the container supports, which actuating means is illustrated in its inoperative condition;

Fig. 11 is a front elevational view showing a receptacle of the present invention adapted to be employed in conjunction with the mixing device;

Fig. 12 is a sectional view taken substantially along the line 12—12 of Fig. 11; and Fig. 13 is a sectional view taken substantially along the line 13—13 of Fig. 11, with the container supporting means in operative condition.

Referring now more particularly to the drawings, and specifically to Figs. 1-3 thereof, the embodiment of the invention illustrated therein comprises an upstanding base or stand, generally designated 10, and a drive motor assembly, generally designated 11, mounted on the upper end of the stand and overhanging forwards of the stand. A mixing element or material engaging member 12 depends below the motor, and bracket members 13 and 14 are movably mounted below the motor on opposite sides of the mixing element to releasably support a container 15 in operative position receiving the mixing element.

The base 10 has its lower portion preferably of enlarged, relatively broad proportions or stable resting engagement with an appropriate supporting surface. The stand 10 is formed with a vertically disposed, forwardly opening recess or concavity defined by an arcuate rearwardly bowed wall 18 extending between laterally spaced forwardly extending side portions 19 and 20 of the stand. While the lower end 21 of the stand 10 is preferably shaped so as to incline the stand slightly rearwards, the drawings illustrate the device as substantially vertical and the device will be described without reference to the inclination for purposes of simplicity.

The stand 10 further includes spaced, opposed side walls 21 and 22 which extend rearwards beyond the rearwardly bowed recess wall 18, see Fig. 8, to provide a rearward space 25 within the stand for housing mechanisms. The side walls terminate at their upper ends in a top wall 23. Extending laterally between the rear edges of the stand side walls 21 and 22, to close the space 25, is detachably secured a rear stand wall or plate 24.

It will be noted that the recess defined by the rearwardly bowed wall 18 opens through the upper end of the strand 10; and, a generally circular motor mounting plate 27 is fixedly secured on the upper end wall 23 of the stand and extends forwards from the latter to overhang the recess 18. Formed centrally of the mounting plate 27, over the recess defined by the wall 18, is a through aperture 28; and, a plurality of upstanding, motor supporting bosses 29 are provided on the upper surface of the mounting plate in spaced relation about the aperture. Also formed on the upper surface of the circular plate 27 disposed forwards of the aperture 28, is a generally radially extending, hollow protuberance or boss 30 which slidably receives a spring biased plunger 31. That is, the plunger 31 is mounted in the boss 30 for sliding movement rearwards or inwards against the spring 32, and forwards or outwards, as urged by the spring, to the position of Fig. 8, in which it is limited by engagement of the stop washer 33 with the boss. In its extreme forward or outward position, the outer end of the plunger 31 extends beyond the plate 27.

The motor assembly 11 includes a generally bell shaped outer housing or cover 36 having its lower end open and peripherally beaded, as at 37, to snugly receive the overhanging plate 27 and seat on the upper end of 23 of the stand 10. Adjacent to its lower end, the motor cover 36 is formed in its front side with a through bore 38 for receiving the forwardly projecting end of the slidable plunger 31. The rear side of the motor cover is preferably vented, as at 39, and additional vents or apertures 40 may be formed in the upper cover end. If desired, a suitable display holder or frame 41 may be attractively placed on the motor cover.

Interiorly of the bell shaped cover 36, mounted on the bosses 29, is an upstanding, generally vertically disposed electric motor 44 which has its armature shaft 45 depending toward the plate aperture 28. A coupling member 46 extends generally vertically and spacedly through the aperture 28 in the plate or overhang 27 and has its upper end provided with a socket 47 for receiving the motor shaft 45. Set screws 48 are threaded in the socket 47 and engage the motor shaft 45 to fix the coupling member 46 to the motor shaft; and, an opening or bore 50 is formed in the coupling member socket for receiving the inner end of the plunger 31. That is, the coupling member opening 50 is adapted to be aligned with the plunger 31, upon proper orientation of the motor shaft 45, for receiving the inner plunger end when the plunger is depressed inwards to the position of Fig. 9, for purposes appearing presently. Fixedly embedded in and projecting transversely from the coupling member 46, adjacent to the lower end of the latter, is a pin or dowel 51.

The material engaging element 12 includes a plurality, say three, parallel tines 54 depending below the overhang or plate 27 and connected together at their upper ends by a sheet or plate 55. Further, the connecting plate or sheet 55 is fixedly circumposed about an upwardly opening socket 56 which receives and is releasably secured to the lower end of the coupling member 46. It is preferred, for most effective mixing action, that the sheet 55 be secured to the socket 56 so that the tines 54 are arranged eccentrically of the motor shaft. The socket 56 is secured to the coupling member 46 by engagement of the pin 51 in a bayonet slot 57 of the socket; and, a compression spring 58, see Fig. 9, is received in the lower end of the coupling member and engages with the socket 56 to releasably hold the latter in its secured relation on the coupling member.

Also, fixedly circumposed about the socket 56, just above the tine connecting plate 55 and spaced below the underside of the overhang 27 is a generally horizontally disposed, circular baffle plate 60. The plate 60 is preferably secured on the socket 56 in substantial alignment with the motor shaft 45, so as to rotate axially upon rotation of the motor, and has its peripheral margin turned or flanged downwards, as at 61.

It will now be understood that the tines 54, the tine connecting sheet 55, socket 56 and baffle plate 60 combine to define a mixing element assembly; and, that the assembly may be connected to the lower end of the coupling member 46 by reception of the latter in the socket 56 and engagement of the pin 51 in the bayonet slot 57. As best seen in Fig. 8, it is necessary to rotate the mixing element assembly relative to the coupling member 46 until the pin 51 engages in a notched portion 62 of the bayonet slot, whereupon release of the mixing element assembly permits the spring 58 to resiliently retain the pin in the notched portion. Of course, removal of the mixing element assembly may be effected by reversal of the above described procedure. In order to facilitate attachment and removal of the mixing element assembly, the coupling member 46 may be held against rotation by inward depression of the plunger 31 to engage the inner end of the latter in the bore 50, so that the mixing element assembly may be rotated as desired relative to the coupling member.

The electric circut of the motor 44 is seen in Fig. 7, as including a supply line 63 connected to one side of the motor, and another supply line 64 connected to the other side of the motor, both supply lines being connected to an electrical supply source. In the supply line 63 is connected a manually actuable master switch 65; and, in the other supply line 64 are connected a normally open switch 66 and a normally closed switch 67. A motor starting condenser 68 is connected across the motor 44. As seen in Fig. 4, the master switch 65 is preferably mounted on the inner side of a housing wall 21 and has an operating lever 69 projecting exteriorly of the stand, while the normally open switch 66 and the normally closed switch 67 are mounted interiorly of the stand on the rear surface of the recess wall 18. The motor starting condenser 68 is also mounted interiorly of the stand 10, as by spring clips 70.

The bracket members 13 and 14 are disposed in facing spaced relation on opposites sides and adjacent to the lower end of the mixing element 12. Further, the bracket members are mounted on the stand 10 for swinging movement in opposite directions toward and away from each other about the axes of generally parallel shafts 73 and 74, respectively, which extend forwardly and rearwardly through and are rotatably supported in the stand. In particular, the bracket members 13 and 14 have their upper portions 75 and 76, respectively, detachably fixed to the forward portions of the respective mounting shafts, as by nuts 77 and 78; and, the bracket members are formed on their lower ends with inturned lips or feet 79 and 80 for supporting engagement with the underside of the container 15. The bracket members 13 and 14 are thus movable in one direction, toward each other, for supporting engagement with the underside of the container 15 disposed in operative condition, and are movable in the opposite direction, away from each other, for releasing the container from its operative condition.

The rearward ends of the parallel spaced, rotatable shafts 73 and 74 extend into the interior 25 of the stand, and are there provided with transversely projecting crank or lever arms 83 and 84, respectively. More particularly, the arm 83 has one end fixed to the rearward portion of the shaft 73 for rotation with the latter, and projects transversely from the shaft laterally inwards of the stand 10. Similarly, the arm 84 has one end fixed to the rearward portion of the shaft 74 and projects transversely from the latter, laterally inwards of the stand. The inner end portions of the arms 83 and 84 are disposed in adjacent relation with respect to each other, and respectively provided with slots 85 and 86, each extending longitudinally of its arm. It will now be appreciated that the bracket member 13, shaft 73 and arm 83 are rotatable as a unit about the axis of the latter shaft to define a bracket assembly, and that the bracket member 13, shaft 74 and arm 84 are rotatable as a unit about the axis of the shaft 74 to define another bracket assembly.

In the lower region of the stand 10, a horizontally disposed, laterally extending operating shaft or rod 90 is arranged substantially directly below the arms 83 and 84. One end of the rod 90 is rotatably supported interiorly of the stand by a journal bearing 91, and the other rod end extends outwards through and beyond the side wall 22, being supported in the latter by a bushing 92. A manually actuable operating member or handle 93 projects transversely from and is fixed to the outwardly extending end of the rod 90. Generally centrally of and within the stand 10, a pair of parallel, laterally spaced crank members or bars 94 and 95 are arranged transversely of the rod or shaft 90 with one end of each crank member non-rotatably fixed to the rod. As a preferred form of construction, see Fig. 10, the crank member 94 may have one end bifurcated to define legs 96, 96 which non-rotatably straddle the rod 90. A pin 97 extends between and connects together the crank member ends from the rod 90, and may be provided with a sleeve or spacer 98 rotatably circumposed about the pin. In this manner, the crank members 94 and 95, pin 97 and sleeve 98 combine to define a crank or crank assembly on the shaft 90.

A generally vertically extending actuating shank or stem 100 is disposed in the stand interior 25 above the rod 90 and formed adjacent to but spaced below its upper end with a longitudinally extending slot 101. The upper slotted end portion of the shank or stem 100 is arranged contiguous to the inner, adjacent end portions of the arms 83 and 84, and a forwardly and rearwardly extending pin 103 passes through all of the slots 85, 86 and 101 to loosely connect together the inner ends of the arms 83 and 84, and the upper end portion of the shank. A pair of parallel spaced washers 104 and 105 are disposed forwards and rearwards of the arm and shank connection and secured on opposite ends of the pin 103 to retain the latter in its connecting relation. The pin 103 thus serves to connect the bracket assemblies together for restricted, simultaneous movement in opposite directions, between extreme position determined by the lengths of the slots 85 and 86.

A generally vertically disposed head member or plate 108, which may be of triangular configuration as illustrated, is disposed between the crank members 94 and 95 and fixed at one corner to the lower end of the shank 100. More specifically, the head plate 108 is fixed to and extends generally vertically downwards from the lower end of the generally vertically disposed shank 100, so as to be in alignment with the latter. The head member or plate 108 is formed with a pair of angularly disposed, intersecting slots 109 and 110, the former extending generally vertically in alignment with the stem 100, and the latter extending generally horizontally rearwards, preferably at an angle of just less than 90° with respect to the vertical slot. Extending slidably and rotatably through the vertical slot 109 is the operating shaft or rod 90, so that the stem 100 is vertically shiftable a distance equal to the length of the vertical slot. The crank member connecting pin 97 and spacer sleeve 98 rotate and slide through the slot 110, so that oscillatory rotation of the crank members 94 and 95 between the positions of Figs. 8 and 10, as indicated by the arrows, effects positive vertical shifting movement of the head member 108 and shank 100 between the limiting positions, best seen in Figs. 5 and 6. In the upper position of stem movement the crank members are disposed in dead center or slightly beyond dead center relation with respect to stem, so as to effectively retain the stem in its upper position by toggle-like action.

A retaining nut 102 is fixed on the shank 100 adjacent to its lower end; and circumposed about the shank between the slot 101 and nut 102 is a relatively soft or weak helical spring 112 which bears at its upper and lower ends, respectively, against a pressure member or washer 113 and a washer 114. More specifically, the pressure member or washer 113 is slidably circumposed about the stem 100 just below and engaging with the washers 104 and 105, and the washer 114 is circumposed about the stem 100 and seated on the upper side of the nut 102. The soft spring 112 is maintained in compression at all times by its engagement with the washers 113 and 114. A relatively heavy or strong helical spring 115 is circumposed about the shank 100 between the washers 113 and 114 outwards of the spring 112. Further, the unstressed length of the heavy spring 115 is less than the distance between the washers 113 and 114 when the shank 100 is in its lowermost position of Fig. 5.

Upon upward shifting movement of the shank 100, the pin 103 in the slot 101 is also shifted upwards and effects upward swinging movement of the adjacent ends of bracket assembly arms 83 and 84. If the bracket members 13 and 14 are allowed to swing to their extreme position of movement toward each other, that shown in Fig. 4, the spring 112 will not be further compressed or shortened in length from its condition illustrated in Fig. 5, and the strong spring 115 will not engage with the pressure member or washer 113. However, if the bracket members 13 and 14 are restrained to a limited position of movement toward each other, as by the container 15 in Fig. 6, when the actuating stem 100 has been shifted to its uppermost position, the arms 83 and 84, being rigid with the bracket members, are restrained to a limited position which, through the pin 103 and washers 104 and 105 holds the bearing member 113 down in compressing engagement with the relatively strong spring 115. For clarity, the washer 105 has been omitted in Figs. 5 and 6. Thus, the force of the relatively strong spring 115, in addition to that of the light spring 112, serves to firmly retain the container 15 in its operative condition.

As the slot 110 declines slightly rearwards, and as the crank 94—95 is in or slightly in its dead center position the heavy spring 115, in the operative condition of Fig. 6, exerts a relatively great, toggle-like force to maintain the crank members 94 and 95 in position. However, as the strong spring 115 is compressed for only a small portion of stem movement, and as the crank 94—95 is substantially in its dead center position when the strong spring is compressed, it will be seen that relatively little effort is required of the operator.

The normally open switch 66 includes an operating arm 117 disposed for engagement with the upper end of the stem 100, so that the latter switch will be closed when the stem is shifted toward its upper position. An operating arm 118 is provided on the normally closed switch 67 and disposed for operative engagement with the bracket assembly arm 83 when the latter moves upwards beyond its limited, operative position of Fig. 6. That is, when the bracket members 13 and 14 swing toward each other beyond the position of Fig. 6, as limited by engagement with the receptacle 15, the switch arm 118 is actuated to open the normally closed switch 67 and prevent operation of the motor 44.

The container 15 includes a generally circular cover or lid 120 which is spacedly circumposed about the socket 56 immediately below or adjacent to the undersurface of the overhang 27, so as to be retained about the socket by the baffle plate 69. The container lid 120 includes a depending peripheral flange 121 which houses a yieldable, annular gasket 122.

The container 15 also includes a generally cylindrical, open top cup or receptacle 123 of a size to fit between the bracket members 13 and 14 with the bracket member feet 79 and 80 engaging under the bottom wall 124 of the cup. Adjacent to the lower cup end, the side wall 125 of the cup 123 is formed with a tubular outlet opening or spout 126; and, a guide vane 127 is fixed interiorly of the cup 123 adjacent to and on one side of the outlet 126 to direct material being mixed toward the outlet. A generally rectangular, vertically extending guide plate 128 surrounds the outlet 126, being fixedly secured flush with the outer end thereof, and has its lower end provided with laterally extending shoulders 129, 129. The upper end corners of the guide plate 128 are bent forwards, as at 130, 130; and, a channel-like slide 131 extends laterally across the outer face of the guide plate 128, and has side flanges 132, 132 slidably engageable inwards of the vertical guide plate margins. The channel member or slide is thus vertically slidable along the guide plate 128 into and out of a position directly in front of the outlet opening or spout 126.

A closure plate 135 is disposed between the guide plate 128 and channel member 131; and, a coil compression spring 136 is interposed between the closure plate and channel member to resiliently urge the former inwards toward the guide plate and the latter outwards, away from the guide plate. A stem or pin 137 projects from the closure plate 135 interiorly the coil spring 136 and slidably through and outwards beyond the channel member 131, to position the closure plate relative to the channel member and retain the compression spring in position between the closure plate and channel member. Mere upward movement of the pin 137 will effect sliding movement of the channel member 131 and closure plate 135 along the guide plate 128 to open the outlet 126. Such upward movement is limited by engagement of the closure plate 135 with the bent corners 130. Mere downward movement of the pin 137 reverses movement of the closure plate and channel member to close the outlet opening, the channel member being engageable with the shoulder 129 to limit downward movement.

A handle or loop 138 is preferably provided on the cup side wall 125 adjacent and on one side of the outlet opening 126.

In operation, the master switch 65 is manually thrown to its closed position, and the desired quantities of material to be mixed are introduced into the container cup 123, with the closure plate 135 in covering or closing relation with respect to the outlet tube 126. The actuating handle 93 is now in its up position of Fig. 2 so that the stem 100 and head member 108 are in their lower, inoperative position of Fig. 5. The filled container may now be grasped by the handle 138 and inserted into the front recess of the stand 10 with its upper end or rim engaging the lid gasket 122. The bracket members 13 and 14 are in their extreme position of movement away from each other, as in Fig. 2, so as not to obstruct insertion of the cup in the stand recess. Upon such insertion of the cup, the mixing element 12 enters into and is received in the cup. It is then only necessary to swing the operating handle 93 down to its operative position of Figs. 1 and 3, which shifts the stem 100 up to its operative position of Fig. 6. Upward movement of the stem 100 actuates the bracket assemblies to swing the bracket members 13 and 14 toward each other into engagement with the underside of the receptacle bottom wall 124, and causes the switch 66 to close and energize the motor 44. The receptacle is thus firmly clamped upwards against the container lid 121 which is clamped in abutting engagement with the underside of the overhang 27; and, this firmly clamped relation is maintained by the toggle action of the actuating stem 100, its head member 108, the crank 94—95, and the spring means 112 and 115. As noted hereinbefore, the presence of the container 115 in its operative condition abutting the underside of the overhang 27 limits the swinging movement of the bracket assemblies in their upward direction, so that the switch 67 remains in its normally closed condition.

After the material in the receptacle 123 has been sufficiently mixed, it may be quickly and simply dispensed by merely raising the pin 137 to shift the closure member 135 to its upward, open position, whereupon the guide vane 127, see Fig. 13, will direct counterclockwise moving material toward the outlet tube. When the desired quantity has been received through the outlet opening, the pin 137 may be shifted downwards to close the receptacle. If desired, the cup and remaining material may be left in position, and the master switch 65 opened to prevent further mixing.

Should the handle 93 be inadvertently swung to its down position, without a container disposed in operative condition receiving the mixing element, the bracket assemblies will swing beyond their limited position of Fig. 6 to their extreme position of Fig. 4. The arm 83 will then operate to open the normally closed switch 67 and prevent operation of the motor 44.

From the foregoing, it is seen that the present invention provides a material treating device which fully accomplishes its intended objects, and is well adapted to meet practical conditions of manufacture, maintenance and use.

Although the present invention has been described in some detail by way of illustration and example for purposes of clarity of understanding, it is understood that certain changes and modifications may be made within the spirit of the invention and scope of the appended claims.

What is claimed is:

1. In a material treating device, a stand, an overhang on said stand, a rotary material engaging element depending from said overhang for entry into a container removably disposed in operative condition below and abutting said overhang, electric drive means connected to said engaging element to effect rotation of the latter, bracket means mounted on said stand below said overhang and movable in opposite directions for releasably supporting the container in said operative abutting condition, said bracket means being restrained to a limited position of movement in one direction by a container in said operative condition, actuating means connected to said bracket means for effecting movement of the latter between their extreme positions of movement, normally open switch means connected between said drive means and an electric supply source and arranged to be closed by said actuating means upon movement of said bracket means in said one direction into said limited position, and normally closed switch means connected between said drive means and said electric supply source and arranged to be opened by movement of said bracket means in said one direction beyond said limited position, said engaging element thus being operable only when a container is disposed in said operative condition and supported by said bracket means in said limited position.

2. A material treating device according to claim 1, said actuating means comprising a stem mounted in said stand for positive shifting movement and loosely connected to said bracket means to move the latter in said opposite directions, and a resiliently biased pressure member carried by said stem and operatively connected to said bracket means to yieldably urge the latter in said one direction, said pressure member thus urging said bracket means toward their extreme position of movement in said one direction to firmly support a container in said operative condition and to open said normally closed switch when a container is not disposed in said operative condition.

3. A material treating device according to claim 1, said bracket means comprising a pair of bracket members disposed on opposite sides of said engaging element and mounted on said stand for swinging movement toward each other in said one direction to support said container and away from each other in said other direction to release said container, and a pair of arms each fixed relative to a respective one of said bracket members for swinging movement therewith and connected to said actuating means for actuation by the latter, one of said arms being engageable with said normally closed switch to open the latter when said bracket members are swung to their extreme position of movement toward each other.

4. A material treating device according to claim 3, said actuating means comprising a stem mounted in said stand for positive shifting movement and loosely connected to said arms to effect movement of said arms and hence movement of said bracket members toward and away from each other, said stem being engageable in one direction of its shifting movement with said normally open switch to close the latter, and a resiliently biased pressure member carried by said stem and operatively connected to said arms to yieldably urge said bracket members toward their extreme position of movement toward each other for opening said normally closed switch or firmly supporting a container in said operative condition.

5. A mixer comprising an upstanding base, an overhang on the upper end of said base, a rotary mixing element depending from said overhang for entry into a container removably disposed in operative condition below and abutting said overhang, a pair of spaced bracket members disposed on opposite sides of said mixing element below said overhang and mounted on said base for swinging movement toward and away from each other to releasably support a container in said operative abutting condition, said bracket members being restrained to a limited position of their swinging movement toward each other by engagement with a container in said operative condition, a pair of arms in said base each fixedly connected to a respective bracket member for movement therewith and loosely connected together to permit said bracket movement, an actuating stem loosely connected to said arms and mounted in said base for longitudinal shifting movement to swing said arms and move said bracket members toward and away from each other, a resiliently biased pressure member slidably on said actuating stem and operatively connected to said arms to bias the latter in one direction and yieldably urge said bracket members toward their extreme position of movement toward each other to firmly support a container in said operative condition.

6. A mixer according to claim 5, in combination with spring means on said actuating stem and engageable with said pressure member when said bracket members are in said limited position to increase the force urging said bracket members toward each other and more firmly support a container in said operative condition.

7. A mixer according to claim 5, in combination with a head fixed on said stem and formed with a pair of intersecting slots one of which extends longitudinally of said stem, an operating shaft rotatably mounted in said base and extending rotatably and slidably through said one slot enabling said stem and head to shift longitudinally of said stem, and a crank having one end fixed to said operating shaft for rotation therewith and having its other end rotatably and slidably received in the other of said slots, whereby oscillatory rotation of said operating shaft and crank cause said other slot and effect longitudinal shifting of said stem.

8. In a mixing device, a stand, an overhang on the upper end of said stand, an electric motor mounted on the upper side of said overhang, a rotary mixing element depending below said overhang and connected to said motor to be driven by the latter, a container removably disposed in operative position receiving said mixing element below and abutting the underside of said overhang, bracket means mounted on said stand for movement into and out of engagement with the underside of said container to releasably clamp the latter in said operative position, switch means electrically connected in the supply line of said motor for holding said supply line open except when said container is clamped in said operative position, and normally closed switch means electrically connected in said supply line of said motor for holding said line closed to said motor except when said bracket means is moved into its container clamping position and a container is not clamped thereby.

9. A mixing device comprising an upstanding base, a forwardly extending overhang on said base, an electric motor mounted on the upper side of said overhang, a rotary mixing element depending below said overhang and releasably coupled to said motor, said mixing element being adapted to enter a container removably disposed in operative condition below and abutting the underside of said overhang, a pair of generally forwardly and rearwardly extending shafts disposed on opposite sides of said mixing element and rotatably mounted in said base, a pair of spaced bracket members fixed on the forward portions of said shafts and rotatable therewith in opposite directions to releasably support said container in said operative abutting condition, a pair of arms projecting transversely from rearward portions of said shafts for swinging movement with the latter and loosely pivotally connected together to constrain said shafts and bracket members to restricted simultaneous movement in said opposite directions, said bracket members and hence said shafts and arms being restrained to a limited position of movement in one direction by a container in said operative condition, an upstanding actuating stem loosely pivotally connected to said arms and mounted in said base for longitudinal shifting movement to swing said arms, shafts and bracket members in said opposite directions, a resiliently biased pressure member slidable on said actuating stem and operatively connected to said arms to yieldably urge the latter and said bracket members in said one direction beyond said limited position when a container is not in said operative condition, a normally open switch electrically connected in the supply line of said motor and arranged in said base to be closed by said stem upon shifting of the latter to move said bracket members in said one direction into said limited position, and a normally closed switch electrically connected in said motor supply line and arranged in said base to be opened by movement of said arms and movement of said bracket members in said one direction beyond said limited position, said motor and hence said mixing element thus being operable only when a container is disposed in said operative condition and supported by said bracket members.

10. A mixing device according to claim 9, in combination with a head fixed on the lower end of said stem and formed with a pair of intersecting slots one of which extends longitudinally of said stem, a generally horizontally disposed rod rotatably mounted in said base and extending rotatably and slidably through said one slot, said rod constraining said head and stem to shifting movement longitudinally of said stem within the limits of said one slot, and a crank disposed transversely of and having one end fixed to said rod for rotation therewith and having its other rotatably and slidably received in the other of said slots, whereby oscillatory rotation of said rod and crank causes said other crank end to move in said other slot and effect longitudinal shifting of said stem.

References Cited in the file of this patent

UNITED STATES PATENTS

| 358,947 | Southworth | Mar. 8, 1887 |
|---|---|---|
| 1,854,472 | Jones | Apr. 19, 1932 |
| 2,021,626 | Flegel | Nov. 19, 1935 |
| 2,168,429 | Myers | Aug. 8, 1939 |
| 2,463,697 | Kipper | Mar. 8, 1949 |
| 2,611,588 | Kelly et al. | Sept. 23, 1952 |

FOREIGN PATENTS

| 277,283 | Switzerland | Nov. 16, 1951 |